July 3, 1923. Re. 15,642

C. F. SMITH ET AL

ELECTRIC CONDENSER

Original Filed May 17, 1920

Inventors
Charles F. Smith
and William H. Smith
By George C. Sloan
their Attorney Reissued July 3, 1923. Re. 15,642

UNITED STATES PATENT OFFICE.

CHARLES F. SMITH AND WILLIAM H. SMITH, OF BROOKLYN, NEW YORK.

ELECTRIC CONDENSER.

Original No. 1,395,931, dated November 1, 1921, Serial No. 382,090, filed May 17, 1920. Application for reissue filed October 13, 1922. Serial No. 594,391.

*To all whom it may concern:*

Be it known that we, CHARLES F. SMITH and WILLIAM H. SMITH, both citizens of the United States, and residents of the borough of Brooklyn, county of Kings, city and State of New York, have jointly invented certain new and useful Improvements in Electric Condensers, of which the following is a specification.

Our invention relates to electric condensers and has for its object to provide an improved simple and efficient condenser of this character, and also an improved method for the easy and expeditious making of such condensers. Condensers of our improved type are intended primarily for use in wireless telegraphy or telephony but they are also adapted for other uses.

A satisfactory embodiment of a condenser made according to our invention is shown in the accompanying drawing. The condenser there illustrated comprises units any number of which may be assembled readily to form a condenser of the desired capacity. Each of the units shown comprises a base or body portion which gives the unit the requisite strength or stiffness; a flexible dielectric, preferably paper impregnated with insulating material, such as wax; and sheets of metal foil preferably non-resilient metal, such as lead or "tin foil," though other metal foils may be used; such dielectric and metal foils being folded or wrapped together.

A desirable embodiment of our invention is shown in the accompanying drawings, in which—

Figure 2:
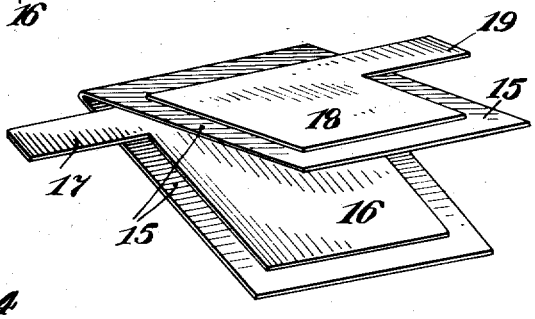
Fig. 2, is a perspective view showing the manner of assembling the metal foil and flexible insulating sheets of the unit.
Figure 3:
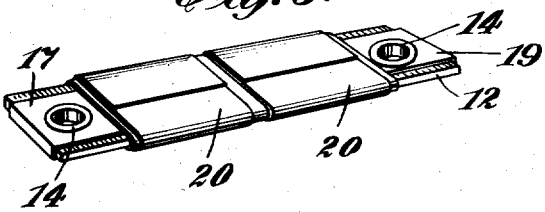
Fig. 3, is a perspective view of a completed unit.

Referring to the drawing, in which some of the thin parts are necessarily somewhat exaggerated for clearness of illustration, 12 denotes the base or body portion of the improved condenser unit. This base or body is made of any material which has sufficient strength or stiffness and also the electrical characteristics required to act as a proper support. We prefer to make the body portion 12 of thin vulcanized fiber board, which has the requisite stiffness and also offers the advantage that it is not softened or affected by moisture, as ordinary pasteboard would be. Adjacent to its ends, the body portion 12 is provided with holes 13, adapted to receive eyelets 14, as more fully set forth below. To make the improved condenser shown in the drawing, we then take a strip of flexible dielectric 15, for instance waxed paper, and fold it upon itself at the center, as indicated in Fig. 2; a sheet of metal foil 16, with a lead 17 projecting therefrom at one side, is placed between the two layers of the folded or doubled sheet of dielectric 15, so that the same surface of said sheet 15 (the inner surface) will be adapted to engage both surfaces (the upper and the lower surface) of said sheet of metal foil 16. On top of the folded dielectric sheet 15, so as to be in contact with its upper or outer surface, is placed a second sheet of metal foil 18, similar to the sheet 16, except that the lead 19 of the sheet 18 and the lead 17 of the sheet 16 project from the folded dielectric sheet 15 at opposite sides thereof. The sheets 16 and 18 of metal foil are smaller in size than each of the halves or plies of the folded dielectric, so that the edges of the latter extend beyond the sheets of metal foil to prevent short-circuiting. Preferably as shown in Fig. 2, the leads 17, 19 are placed adjacent to the fold connecting the two plies of the dielectric sheet 15; this gives them a more protected position during the wrapping of the dielectric and of the metal foil. While we have shown these 17, 19 as integral with the respective metal foil sheets 16 and 18, this is not essential.

Figure 4:
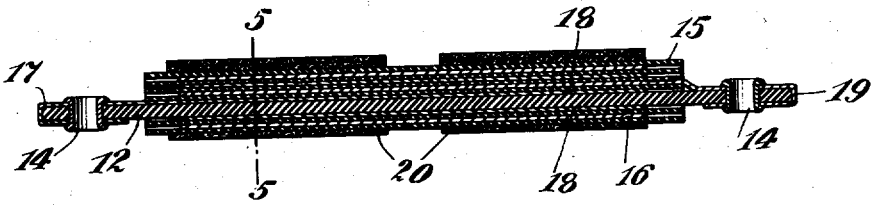
Figs. 4 and 5 are longitudinal and transverse sections, respectively, of the improved condenser unit.
Figure 5:
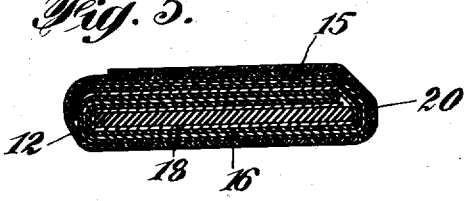
Figure 1:
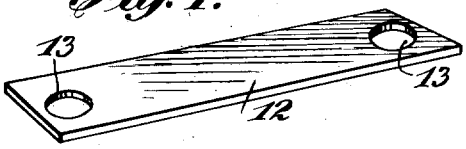
Fig. 1 is a detail view of the base or body portion of a condenser unit.

In the form of our invention illustrated, and more particularly with reference to Figs. 4 and 5, the folded dielectric sheet 15 and the two metal sheets 16, 18 are wrapped in a somewhat spiral way, about the base or body portion 12, it being noted that the latter is longer than the sheet 15, so that the ends of the body portion will project beyond the said sheets 15 when the latter, with the two sheets of metal foil 16, 18 is placed against the central part of the body portion 12, see Figs. 3, 4, 5 and 6. Preferably the parts shown in Fig. 2, are placed against said body portion 12 in such a manner that the fold or crease 15′ will lie adjacent to one of the longitudinal edges of said body. Then, in the particular procedure which results in the production of the article or unit here shown, the parts shown in Fig. 2, are wrapped around the body portion 12, so that the latter will, as it were, form a core surrounded by such wrapped parts, the leads 17, 19, however, remaining unwrapped, as they are applied flatwise against the one surface (the upper surface in Fig. 4) of the body portion 12. If desired the leads 17, 19 may be of considerably greater area than that of the projecting ends of the body portion 12, so that they can be folded around said projecting ends. In this case the leads are longer than the ends and are folded over the ends of the said base or body portion, so that each lead extends around over both surfaces of one end of the body portion, as shown in Fig. 4. The wrappings of metal foil and dielectric are then surrounded or covered by a paster or plasters 20, of thin muslin or other sheet material, whereby the said wrappings are securely held in place on the body 12 of the condenser unit. Eyelets 14, preferably of brass, are then inserted in the holes 13 of the base or body portion 12, said eyelets passing through both the upper and the lower layer of the folded lead 17 or 19, and thus serving to secure said leads firmly about and against both surfaces of the body portion.

Figure 6:
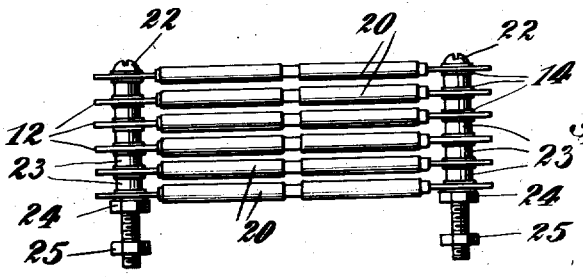
Fig. 6 is an elevation showing a number of condenser units suitably mounted.

These units may be secured in the electrical circuit in any desired way. As illustrated in the drawings, the eyelets serve for the reception of screws or bolts 22, on which are mounted nuts 24, to be screwed up against the lower side of the body 12, or rather of the eyelets 14, of the lowermost condenser unit when a number of the units are assembled, as shown in Fig. 6. The said screws or bolts 22 are also preferably provided with nuts 25, by which the assembled condenser units may be fastened to a suitable panel or the like when the condenser is mounted in place for use. The condenser units are spaced apart on the screws or bolts 22 by collars or sleeves 23 forming distance pieces. It will be understood that the assembly of condenser units as shown in Fig. 6, affords a convenient manner of utilizing the invention, as each unit is, in itself, a complete condenser.

The improved condensers or condenser units, when completed, are tested by a microfarad meter, and each unit or grid is labeled, to show capacity, which is determined by the length of the body and breadth and thickness of the waxed paper dielectric.

From the foregoing it will be understood that the invention provides an electric condenser of simple construction which has been found to be very efficient and durable in use.

The body portion 12 should be made of insulating material, or at least in such a manner as to form no electrical connection between the leads 17 and 19, which must be insulated from each other.

Various modifications may be made without departing from the nature of our invention as set forth in the appended claims.

As indicated above, the thickness of the paper and foil are necessarily exaggerated in Figures 2, 4 and 5 in order to make illustration possible. To those skilled, however, it will be obvious that the twelve thicknesses of paper and foil shown in Figs. 4 and 5, actually aggregate less than 1/32nd of an inch in thickness, hence the middle portion of the base 12, is practically necessary as a stiffening means for the folded paper and foil constituting the condenser, just as the projecting ends serve as stiffening means to which leads 17, 19 are riveted.

We claim as our invention:

1. An electric condenser unit comprising a base or body of thin fiber board and a wrapping of dielectric and metal foil encircling said base or body, the sheets of metal foil being smaller in size than the sheets or plies of dielectric, said sheets of metal foil having leads which are folded around the ends of the fiber base or body, and means for securing the wrapping of dielectric and metal foil in place about said base or body.

2. An electric condenser unit comprising a base or body of thin fiber board and a wrapping of dielectric waxed paper and metal foil encircling said base or body, the sheets of metal foil being smaller in size than the sheets or plies of waxed paper, said sheets of metal foil having leads which are folded around the ends of the fiber base or body, and means for securing the wrapping of dielectric and metal foil in place about said base or body.

3. An electric condenser unit comprising a base or body of thin fiber board and a wrapping of dielectric waxed paper and metal foil encircling said base or body, the sheets of metal foil being smaller in size than the sheets or plies of waxed paper, said sheets of metal foil having leads which are folded around the ends of the fiber base or body, and a securing wrapper or paster passing around the wrapping of waxed paper and metal foil.

4. An electric condenser comprising a base or body of thin fiber board and a wrapping of dielectric and metal foil encircling said base or body, the sheets of metal foil being smaller in size than the sheets or plies of dielectric, said sheets of metal foil having metal foil leads which are folded around the ends of the fiber base or body, and means for securing the wrapping of dielectric and metal foil in place about said base or body.

5. An electric condenser comprising a relatively long, narrow, thin base or body of relatively stiff insulating material and a wrapping of flexible dielectric sheets and metal foil encircling said base or body; the sheets of metal foil being smaller in size than the dielectric sheets; the body or base being substantially longer than the width of the wrapping sheets to afford projecting ends; and said sheets of metal foil having leads projecting in opposite directions and each secured to the face of the corresponding end of the base; and means for securing the wrapping of dielectric and metal foil in place about said base.

6. An electric condenser comprising a relatively long, narrow base, or body of thin fiber board and a wrapping of flexible dielectric sheets and thin metal or foil encircling said base or body between projecting ends of the latter, the sheets of metal foil being narrower and shorter than the sheets of dielectric; and terminals consisting of thin metal or foil, one secured against a face of a projecting end of the base or body and conductively associated with one sheet of the foil and the other terminal similarly secured to the other projecting end and similarly associated with the other sheet of foil.

7. An electric condenser comprising a wrapping of metal foils and of flexible dielectric interposed between said foils, a relatively stiff body the ends of which project beyond said wrapping, conducting leads which extend from said foils adjacent to said ends of the body, and which are folded over said ends so that each lead will have layers on opposite sides of the respective body end, and securing means extending through said body ends and through both layers of the respective folded leads.

8. An electric condenser comprising a wrapping of metal foils and of flexible dielectric interposed between said foils, a relatively stiff body the ends of which project beyond said wrapping, conducting leads which extend from said foils adjacent to said ends of the body, and eyelets extending through said body ends and through the adjacent leads to secure the latter firmly to said body and to provide means for the reception of screws or bolts serving to assemble a plurality of condenser units.

9. An electric condenser comprising a wrapping which consists of a sheet of flexible dielectric folded upon itself to form two plies, a metal foil located between the plies of such folded dielectric, another metal foil located on the side of the dielectric opposite to the first named foil, a supporting body for said wrapping, and leads extending from said metal foils.

10. An electric condenser comprising a wrapping which consists of a sheet of flexible dielectric folded upon itself to form two plies, a metal foil located between the plies of such folded dielectric, another metal foil located on the side of the dielectric opposite to the first named foil, and leads extending from said metal foils.

11. An electric condenser comprising a wrapping which consists of a sheet of flexible dielectric folded upon itself to form two plies, a metal foil located between the plies of such folded dielectric, another metal foil located on the side of the dielectric opposite to the first named foil, a supporting body projecting beyond said wrapping at each end, leads connected with said metal foils and extending adjacent to the projecting ends of said body, and means for securing said leads firmly to said body ends.

12. An electric condenser comprising thin sheets of metal foil separated by thin flexible di-electric, assembled as a relatively thin and flexible condenser element in combination with a stiffening support therefor consisting of a relatively thin stiff body of insulating material having portions thereof projecting beyond said assembled sheets, conducting leads from the foil sheets and terminals therefor consisting of hollow eyelets riveted through said stiffening support.

13. An electric condenser comprising thin metal foils separated by thin flexible dielectric sheets wrapped around a relatively thin stiff body of insulating material, the ends of which project beyond said wrapping, conducting leads respectively riveted to opposite projecting ends of said body and extending in conducting relation with different sheets of said metal foil.

14. An electric condenser comprising thin metal foils separated by thin flexible dielectric sheets wrapped around a relatively thin stiff body of insulating material the ends of which project beyond said wrapping, conducting leads respectively riveted to opposite projecting ends of said body and extending between the dielectric sheets, each in conducting relation with one only of said metal foils.

15. An electric condenser comprising two sheets of thin metal foils separated by two sheets of flexible dielectric and the four folded together to form a thin narrow condenser element, a relatively stiff body of insulating material the ends of which project beyond said condenser element, an external wrapper securing said condenser element to said relatively stiff body and conducting leads respectively riveted to the opposite projecting ends of said body and extending between the dielectric sheets, each conductively connected with one only of said metal foil sheets.

Signed in New York City, county and State of New York, this 21st day of September, 1922.

CHARLES F. SMITH.
WILLIAM H. SMITH.